Feb. 17. 1925.  1,526,683
F. O. SEAVEY
AUTOMATIC INSTANTANEOUS ELECTRIC WATER HEATER
Filed Sept. 16, 1921    2 Sheets-Sheet 1
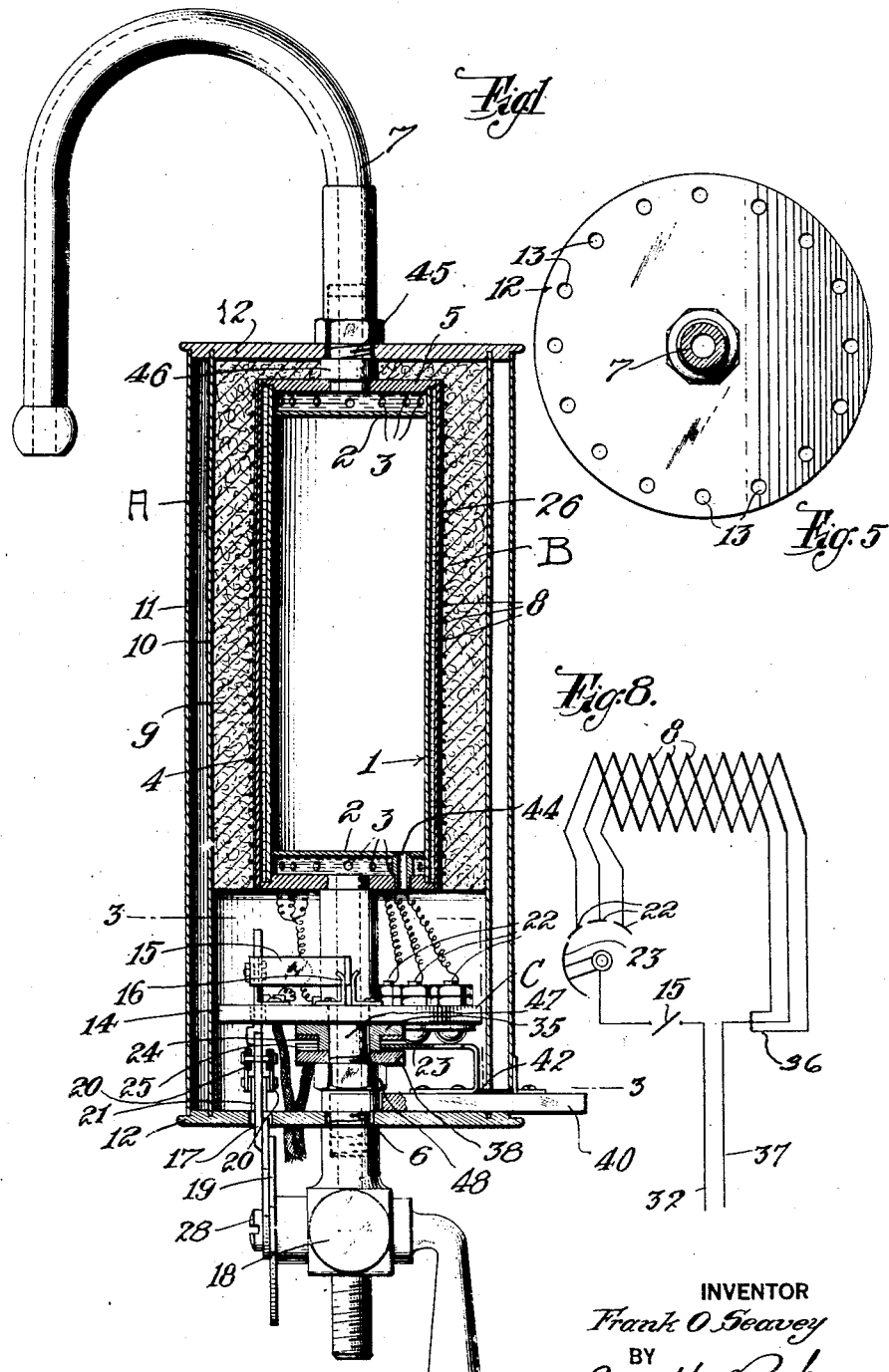
INVENTOR
Frank O. Seavey
BY
Everett N. Pook,
ATTORNEYS.

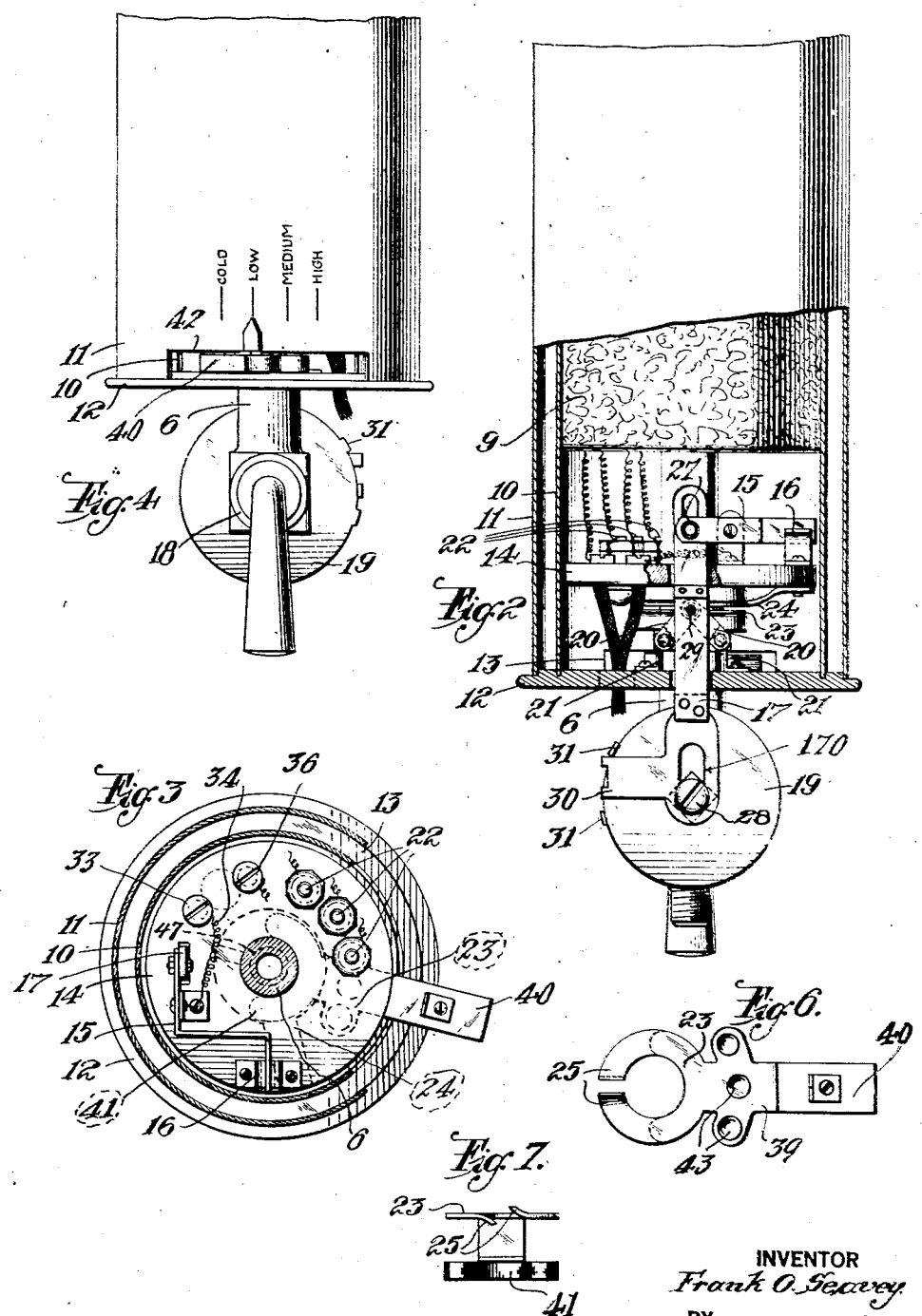

Patented Feb. 17, 1925.

1,526,683

UNITED STATES PATENT OFFICE.

FRANK O. SEAVEY, OF NEWARK, NEW JERSEY, ASSIGNOR TO LAWRENCE C. MURPHY, OF NEWARK, NEW JERSEY.

AUTOMATIC INSTANTANEOUS ELECTRIC WATER HEATER.

Application filed September 16, 1921. Serial No. 501,015.

*To all whom it may concern:*

Be it known that I, FRANK O. SEAVEY, a citizen of the United States, and a resident of Newark, in the county of Essex and State of New Jersey, have invented new and useful Improvements in Automatic Instantaneous Electric Water Heaters, of which the following is a specification.

This invention relates in general to electric liquid heaters, and more particularly to a heater adapted to be connected in a water supply pipe so that the water flows therethrough and is electrically heated during its passage through the heater.

Among the objects of the invention are to provide a heater of the character described embodying novel features of construction whereby the water is heated to the desired temperature substantially instantaneously upon its entering the heater so that hot water is always immediately available in any desired quantity; to thus provide a water heater having a narrow annular passage for water therethrough the walls of which are heated by electric coils so that a thin film of water of large area is formed which is instantaneously heated on contact with the walls of the passage; to provide such a passage and heating coils of an improved construction and arrangement; to provide an improved housing for the heater, and to obtain other results and advantages as may be brought out by the following description.

Referring to the accompanying drawings, in which like numerals of reference indicate the same parts throughout the several views, Figure 1 is a vertical sectional view through an electric water heater embodying my invention;

Figure 2 is a fragmentary view of the lower end of the heater taken from a point at right angles to that of Figure 1, the housing being shown in section and the switch mechanism in side elevation;

Figure 3 is a horizontal sectional view taken on the line 3—3 of Figure 1;

Figure 4 is a side elevation of the lower end of the heater showing the controlling lever;

Figure 5 is a top plan view of the heater with the outlet pipe shown in section;

Figure 6 is a detached plan view of the controlling lever;

Figure 7 is an end view thereof, and

Figure 8 is a wiring diagram of the heater.

In the drawings I have shown my invention embodied in a heater adapted for use by dentists to heat water for the use of patients, the heater being adapted to be arranged in substantially vertical position adjacent the dentist's chair and connected at the lower end to a water supply pipe. The heater comprises a housing A in the upper end of which is arranged the electric heating element B and in the lower end of which is mounted the electric switch and temperature controlling element C.

The heating element B comprises a thin walled metal tube 1, preferably formed of brass, having heads 2 spaced from the ends thereof, the said tube being formed outward of the heads 2 with openings 3, and being surrounded in spaced relation by a concentric metal tube 4 closed at its ends by heads 5 which also close the ends of the tube 1 so as to form chambers in the ends of the tube 1 between the heads 2 and 5. The lowermost head 5 is connected as by soldering to one end of an inlet pipe 6, while the other head 5 is connected to an outlet pipe 7 which is in the form of a goose neck so as to discharge downwardly.

A plurality of heating coils 8, in the present instance three, are wound around the outer tube 4 in the form of a triple helix, mica 26 being interposed between the coils and the tube for electrical insulation, and around the heating coils 8 is wound a heat and electrical insulating wrapping 9 of suitable material, such as asbestos. The heating element B is arranged in the upper end of the housing A which comprises spaced concentric tubes 10 and 11 which are longer than the heating element B and are closed at their ends by heads 12. The space between the tubes 10 and 11 serves as an air heat insulating chamber to prevent a person from being burned by touching the housing, said chamber having openings 13 at the top thereof in the uppermost head 12.

The electric switch and temperature controlling mechanism C which is mounted in the lower end of the housing A comprises a fiber supporting disk 14 on which is pivotally mounted between its ends a switch blade 15, one end of which is adapted to cooperate with a switch terminal 16. The other end of the blade 15 has a pin and slot connection 27 with one end of a switch actuating bar 17, the other end of which is formed with a slot 170 through which passes a screw 28 secured in the end of the plug of a valve 18 which is connected to the water supply pipe 6 to control the flow of water therethrough. A pair of toggle links 20 are arranged on each side of the actuating bar 17, one link of each of said pairs of links having one end thereof connected to an angular leaf spring 21 secured to the lower head 12 of the housing A and the other end thereof pivotally connected by a common pivot 29 to the actuating bar 17. The lower end of the actuating bar is provided with a lateral arm 30 which is adapted to be engaged by lugs 31 on a periphery of an operating disk 19 mounted on the valve plug of the valve 18 to rotate therewith. Assuming the switch blade 15 to be in closed position, as shown in Figure 2, and the valve 18 in open position to allow water to flow through the heater, when the valve plug is rotated to close the valve the uppermost lug 31 on the disk 19 will force the actuating bar 17 downwardly and tend to spread the toggles 20 against the action of the springs 21. The pin and slot connection 27 and the slot 170 permit movement of the actuating bar 17 relative to the switch blade until the toggle links of each pair are brought into alinement, when further rotation of the valve plug will move the toggle pivot 29 so that the springs 21 will collapse the toggles on the opposite side of their pivotal connections with the springs, thus swinging the switch blade 15 into the open position. When the valve plug is rotated in the other direction to open the valve the lower lug 31 on the operating disk 19 engages the arm 30 on the actuating bar 17, and the toggles 20 and actuating bar 17 are moved in the direction reverse to that above described so as to swing the switch blade into closed position. It will be noted that the springs 21 and the toggles 20 cause the switch blade to operate with a snap action so as to prevent arcing of the switch blade and terminal 16. One of the main line wires 32 is connected to a binding screw 33 on the fiber disk 14, the said binding screw being connected to the switch blade 15 in any suitable manner as by the wire 34. The switch terminal 16 is connected to a contact washer 24 which is arranged around the inlet pipe 6 and insulated therefore by a bushing 35 as clearly indicated in Figures 1 and 2.

The plurality of heating coils 8 are provided for the purpose of varying the temperature of the heater, and one terminal of each of the coils is connected to the binding screw 36 of the other main line wire 37. The other terminals of the coils are connected to separate contact studs 22 which are arcuately arranged on the fiber disk 14 and are adapted to cooperate with the contact element 23 of the controlling member. This contact element is in the nature of a slit spring washer and is arranged concentrically with the water inlet pipe 6 between the contact washer 24 and an insulating washer 38, said element being formed with a lateral arm 39 which is returned downwardly and secured to an insulated controller lever 40 having one end 41 bifurcated and movable about the inlet pipe 6 and the other end projecting outwardly through a slot 42 in the housing tubes 10 and 11. The contact element 23 is also formed with a plurality of depressions 43 adapted to receive the contact studs 22. With this construction it will be observed that the electric current is conducted from the switch terminal 16 through the washer plate 24 to the contact element 23 of the controlling member and from the said element 23 to the contact studs 22. The temperature of the heater can thus be controlled by moving the contact element 23 of the controlling member into engagement with one or more of the contact studs 22 which will throw into operation one or more of the heating coils 8. The contact element 23 is resilient in formation, and the depressions 43 therein will thus snap over the contact studs 22 so as to hold the controlling member in the desired position and also indicate to the operator when the controlling element is moved from one contact stud to another.

It will thus be seen that the electric switch is opened and closed simultaneously with the closing and opening of the water supply control valve 18. When the valve 18 is open the water flows through the inlet pipe 6 to the chamber at the lower end of the heating element through the openings 3 in the lower end of the tube 1 and upwardly through the space between the tubes 1 and 4. The space between the tubes 1 and 4 is narrow, and forms an annular passage for the water through which the water passes as a thin film which is instantaneously heated by contact with the walls of the tube 4 around which are wound the heating coils 8. From the passage between the tubes 1 and 4 the water passes inwardly through the openings 3 in the upper end of the tube 1 and thence into the outlet pipe 7. The pin and slot connection 27 and slot 170 enable the valve plug to be rotated a certain extent without affecting the switch, so that the flow of water through the heater can be varied as desired. The valve plug and operating disk 19 initiate the action of the toggles 20, springs 21, and actuating bar in both directions, said toggles and springs serving to close and open the switch with a snap action. To allow ingress and egress of the air from the tube 1 between the heads thereof as the air contracts and expands during the action of the heater, a suitable vent 44 may be provided.

It is desirable that the device be capable of easy and quick assembling and disassembling and for this purpose the heads 12 of the housing may have a detachable connection with the tubes 10 and 11, and the outlet pipe 7 may be connected to the heating element by a threaded nipple 45 which projects loosely through an opening in the upper head 12 and is formed with a flange 46 between which and the end of the outlet pipe the head 12 is clamped. The inlet pipe 6 may be formed with a reduced portion 47 forming a shoulder against which the fiber disk 14 is clamped by action of a nut 48 threaded on the end of the inlet pipe 6, and the lower head 12 may be clamped against the nut 48 by the valve 18 which is screwed onto the end of the inlet pipe outside of the head.

While I have shown and described one embodiment of my invention in detail, it will be understood that this is only for the purpose of illustrating the principles thereof, and that many modifications and changes can be made in the detail construction of the invention without departing from the spirit and scope thereof.

Having thus described the invention, what I claim is:

1. A water heater including a pair of concentric spaced tubes forming an annular chamber therebetween to receive water to be heated, the innermost of said tubes being closed by heads spaced inwardly from the ends thereof, the walls thereof outward of said heads being formed with openings and the outermost of said tubes being closed at its ends by heads which also close the ends of said inner tube, one of said heads of the outer tube being formed with a water inlet and the other of said heads with an outlet, and electrical means for heating the said outer tube.

2. A water heater including a chamber to receive water to be heated, means for heating said chamber, and a housing surrounding said chamber and heating means formed of a pair of spaced telescoping tubular members forming an air heat insulating chamber therebetween.

FRANK O. SEAVEY.